(12) United States Patent
Akirav et al.

(10) Patent No.: US 9,678,972 B2
(45) Date of Patent: *Jun. 13, 2017

(54) PACKING DEDUPLICATED DATA IN A SELF-CONTAINED DEDUPLICATED REPOSITORY

(71) Applicant: INTERNATIONAL BUSINESS MACHINES CORPORATION, Armonk, NY (US)

(72) Inventors: Shay H. Akirav, Petach-Tikva (IL); Michael Hirsch, Mazkeret Batya (IL); Ofer Leneman, Kfar Saba (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/074,195

(22) Filed: Nov. 7, 2013

(65) Prior Publication Data
US 2014/0195495 A1    Jul. 10, 2014

Related U.S. Application Data

(63) Continuation of application No. 13/738,002, filed on Jan. 10, 2013.

(51) Int. Cl.
G06F 12/00        (2006.01)
G06F 17/30        (2006.01)
(52) U.S. Cl.
CPC .......................... *G06F 17/30156* (2013.01)

(58) Field of Classification Search
CPC ... G06F 17/30489; G06F 3/0641; G06F 12/00
USPC .......................................... 707/692; 711/162
See application file for complete search history.

(56) References Cited

U.S. PATENT DOCUMENTS

| 5,522,077 | A  | * | 5/1996  | Cuthbert ............... G06F 9/465 |
|-----------|----|---|---------|------------------------------------|
| 8,046,509 | B2 |   | 10/2011 | Bondurant |
| 8,321,352 | B1 | * | 11/2012 | Rameshkumar ........ G06F 21/12  705/51 |
| 8,650,162 | B1 | * | 2/2014  | Vaikar ................. G06F 11/1451  707/692 |
| 2008/0243769 | A1 | * | 10/2008 | Arbour ............... G06F 11/1453 |
| 2008/0244204 | A1 | * | 10/2008 | Cremelie ............ G06F 11/2097  711/162 |
| 2010/0077013 | A1 | * | 3/2010  | Clements .......... G06F 17/30156  707/822 |
| 2010/0082672 | A1 |   | 4/2010  | Kottomtharayil |
| 2010/0205389 | A1 | * | 8/2010  | Kishi .................. G06F 11/1453  711/162 |
| 2012/0066446 | A1 | * | 3/2012  | Sabjan ............... G06F 11/1662  711/112 |
| 2012/0084261 | A1 |   | 4/2012  | Parab |
| 2012/0089578 | A1 | * | 4/2012  | Lam ................. G06F 17/30159  707/692 |

* cited by examiner

*Primary Examiner* — Hosain Alam
*Assistant Examiner* — Robert F May
(74) *Attorney, Agent, or Firm* — Griffiths & Seaton PLLC (57) ABSTRACT

Deduplicated data is packed in a self-contained deduplicated repository having unique data blocks with each being referenced by a globally unique identifier (GUID). The self-contained deduplicated repository has information regarding both deduplicated data files and the unique data blocks of each of the deduplicated data files and a master GUID list containing a location of each of the unique data blocks.

10 Claims, 6 Drawing Sheets

PACKING DEDUPLICATED DATA IN A SELF-CONTAINED DEDUPLICATED REPOSITORY

CROSS REFERENCE TO RELATED APPLICATIONS

This application is a Continuation of U.S. patent application Ser. No. 13/738,002, filed on Jan. 10, 2013.

FIELD OF THE INVENTION

The present invention relates in general to computers, and more particularly for packing deduplicated data in a self-contained deduplicated repository in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for storing deduplicated data using a processor device, in a computing environment. In one embodiment, by way of example only, deduplicated data is packed in a self-contained deduplicated repository having unique data blocks with each being referenced by a globally unique identifier (GUID). The self-contained deduplicated repository has information regarding both deduplicated data files and the unique data blocks of each of the deduplicated data files and a master GUID list containing a location of each of the unique data blocks.

In another embodiment, a computer system is provided for storing deduplicated data using a processor device, in a computing environment. The computer system includes a computer-readable medium and a processor in operable communication with the computer-readable medium. In one embodiment, by way of example only, the processor, packs deduplicated data in a self-contained deduplicated repository having a plurality of unique data blocks with each being referenced by a globally unique identifier (GUID), and the self-contained deduplicated repository also having information regarding both deduplicated data files and the plurality of unique data blocks of each of the deduplicated data files and a master GUID list containing a location of each of the plurality of unique data blocks.

In a further embodiment, a computer program product is provided for storing deduplicated data using a processor device, in a computing environment. The computer-readable storage medium has computer-readable program code portions stored thereon. The computer-readable program code portions include a first executable portion that packs deduplicated data in a self-contained deduplicated repository having a plurality of unique data blocks with each being referenced by a globally unique identifier (GUID), and the self-contained deduplicated repository also having information regarding both deduplicated data files and the plurality of unique data blocks of each of the deduplicated data files and a master GUID list containing a location of each of the plurality of unique data blocks.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Data deduplication refers to the reduction and/or elimination of redundant data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. As deduplication technology matures, several drawbacks currently exist. For example, the first version needs to be replicated in its entirety, needing disproportionably large bandwidth for this purpose. Another drawback is that the replica is in itself an active repository and continuously requires to be powered. In view of the foregoing, a need exists for deduplication files to be packed onto an isolated, self-contained deduplicated repository that is stored/loaded at a remote location and/or in a clustered network environment (e.g., cloud computing) without requiring the use of power. A need further exists for being able to retrieve the deduplication files from the self-contained deduplicated repository.

To address these aforementioned needs, in one embodiment, by way of example only, deduplicated data is packed in an isolated self-contained deduplicated repository having unique data blocks with each being referenced by a globally unique identifier (GUID). The self-contained deduplicated repository has information regarding both deduplicated data files and the unique data blocks of each of the deduplicated data files and a master GUID list containing a location of each of the unique data blocks.

In one embodiment, the isolated self-contained, deduplicated repository may be stored somewhere in a clustered storage network (e.g., cloud computing) and/or on a removable media device, which may possibly be stored and/or transported without the use of electrical power and energy. (The cloud computing being a model of service delivery that enables convenient, on-demand network access to a shared pool of configurable resources, example including and not limited to networks, network bandwidth, servers, processing, memory, storage, applications, virtual machines, and services, which can be rapidly provisioned and released with minimal management effort or interaction with a provider of the service.) The self-contained, deduplicated repository may be loaded into a target repository as if the data had been replicated, or individual files may be extracted and rehydrated. Since the data in the media is in a deduplicated format, less media (e.g., cloud storage) is required. The self-contained, deduplicated repository is also "self-contained" in the sense that it contains all referenced data blocks named and referenced by globally unique identifiers (GUID's) and contains all deduplication-related metadata that is required to rehydrate, insert, and/or deduplicate the original data into a target repository.

Constructing the structures in the self-contained deduplicated repository requires only sequential writes, and extracting one or more files in their hydrated or deduplicated forms also requires only one sequential pass of the self-contained deduplicated repository. This make it conducive to upload to the clustered storage network (e.g., cloud computing) concurrent with the construction of the self-contained deduplicated repository, and/or for storing on more traditional media devices, such as magnetic tape or energy-efficient rotating disks that spin down when not in use.

In one embodiment, a deduplicating appliance packs deduplicated files onto the removable media (or into the clustered storage network) using structures identified as being needed for the packing In other words, the deduplicating appliance creates the self-contained deduplicated repository by packing data into storage (e.g., within the clustered network) and/or a removable media device. The self-contained deduplicated repository may initially be created on storage directly attached to the deduplicating appliance and then stored there or moved to tape or into the cloud, or it may be built sequentially already on the tape or in the remote storage media (cloud). In a general sense the term "create" may be defined, but is not limited to, assembling together various data and metadata into a structure stored in a persistent medium. Such may be viewed as a process to assemble a data storage structure. For example, an observer may see random bit patterns on the medium before the operation, but after the operation the medium now contains a well-defined structure that serves a purpose: the deduplicated storage of the data objects entrusted to it.

The structures identified as being needed for the packing to be included on the media may include the table of contents (TOC) of the files, digests, deduplication metadata (lists of hashes or other digests or higher level possibly user-level structures or containers of which the file is part), GUID, and one unique copy of each data block required indexed by the GUID, and may also include other items that the deduplicating appliance may find convenient to store with the deduplicated files like file attributes, access lists, ownership details, creation and modification dates, and such like.

Often, deduplicated files are parts of larger, user-level structures like virtual cartridges, OST images or backup container files created by backup applications or backup utilities, such as tar or dump. Thus, in one embodiment, the deduplicating appliance may add this information to the self-contained deduplicated repository if required. This is included in the file metadata in order to differentiate it from other structures that are required, e.g. file table of contents (TOC) and the GUID lists. The structure of the file metadata may also include information about how a file was segmented for deduplication, and/or information about the hashes, or digests of the segments of the entire file, and/or information stored by the deduplication system, such as file name and directory hierarchy, file attributes, access control lists (ACL's), and virtual tape cartridge interface information such as the sizes of writes and the positions of file marks. Such a deduplicated repository is then self-contained and any of the files in the repository can be restored or rehydrated without the need for any other metadata. In addition, one of these repositories can easily be merged into an existing repository by storing all data blocks that are not already there (since GUIDs are globally unique) and then inserting the rest of the file metadata in a process that is similar to regular replication.

In one embodiment, such as in a clustered network storage environment, such as in a cloud storage setting, the mechanisms described herein enable the storing of deduplicated data in a public or private cloud. In order to protect the self-contained deduplicated repository, the self-contained deduplicated repository may be entirely encrypted, and/or different sections of the self-contained deduplicated repository may be separately encrypted. In one embodiment, the data blocks may be encrypted using a user-supplied key, and the entire structure may be encrypted again with a different key that is specific to a particular self-contained deduplicated repository.

Also, in one embodiment, each deduplication system that draws the GUID for the deduplication system from a similar GUID allocation sphere to share each one of a plurality of self-contained deduplicated repositories to be shared for, extract files from each one of the plurality of self-contained deduplicated repositories, and append to each one of the plurality of self-contained deduplicated repositories. In other words, any deduplication system that draws its GUIDs from the same GUID allocation sphere can essentially "share" any self-contained deduplicated repository. The deduplication system may extract files from any self-contained deduplicated repository and the deduplication system may append to any self-contained deduplicated repository. Such operations may be allowed and performed with complete and absolute data safety because the use of GUID's guarantees absolute data safety. Other solutions that use hash-based identifiers can only guarantee probabilistic safety.

Figure 1A:
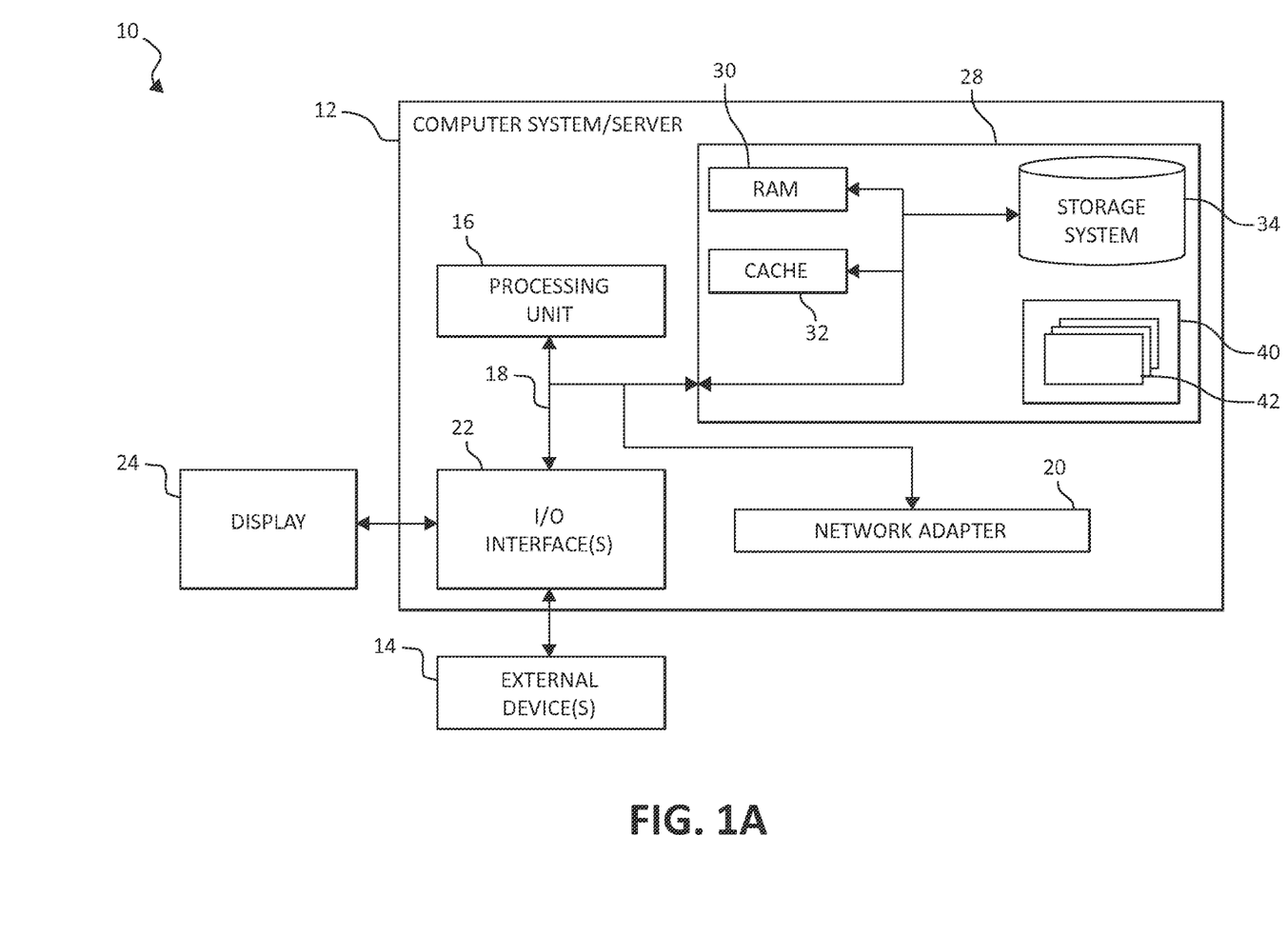
FIG. 1A is a block diagram illustrating a cloud computing node in which aspects of the present invention may be realized.

Turning now to FIG. 1A, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 1B:
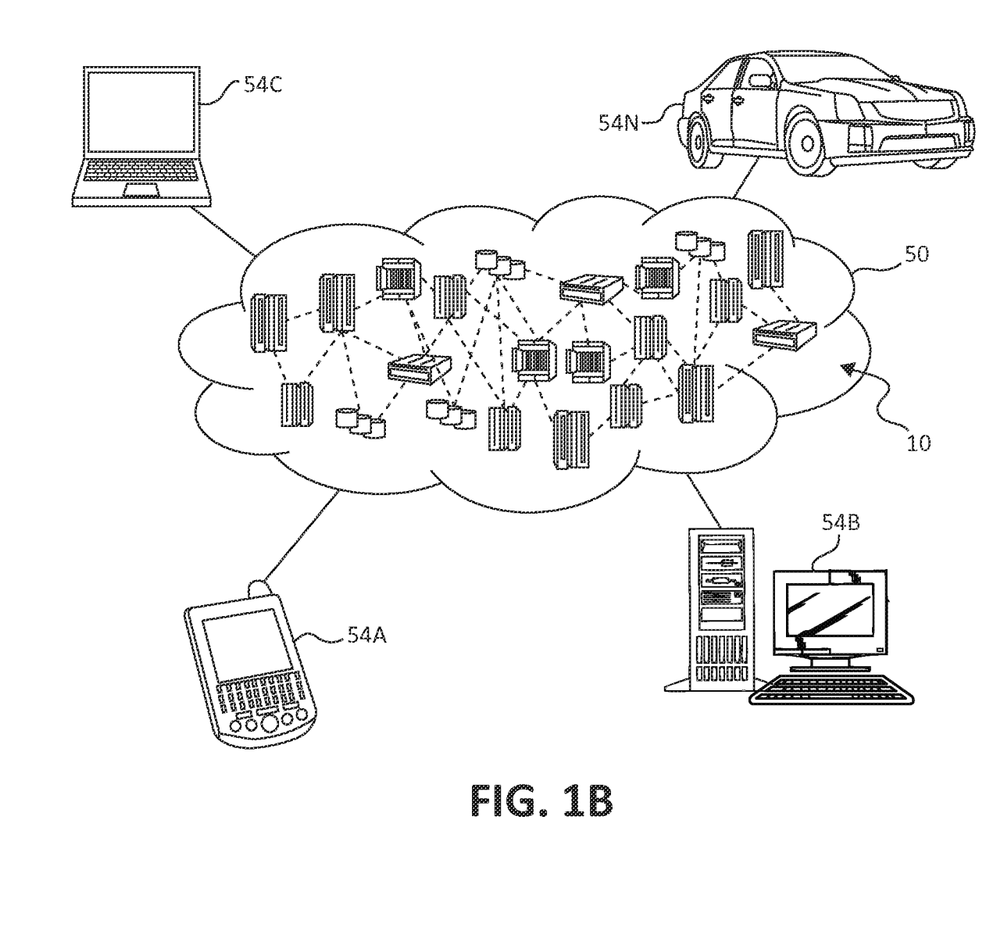
FIG. 1B is a block diagram illustrating a cloud computing environment in which aspects of the present invention may be realized

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 2:
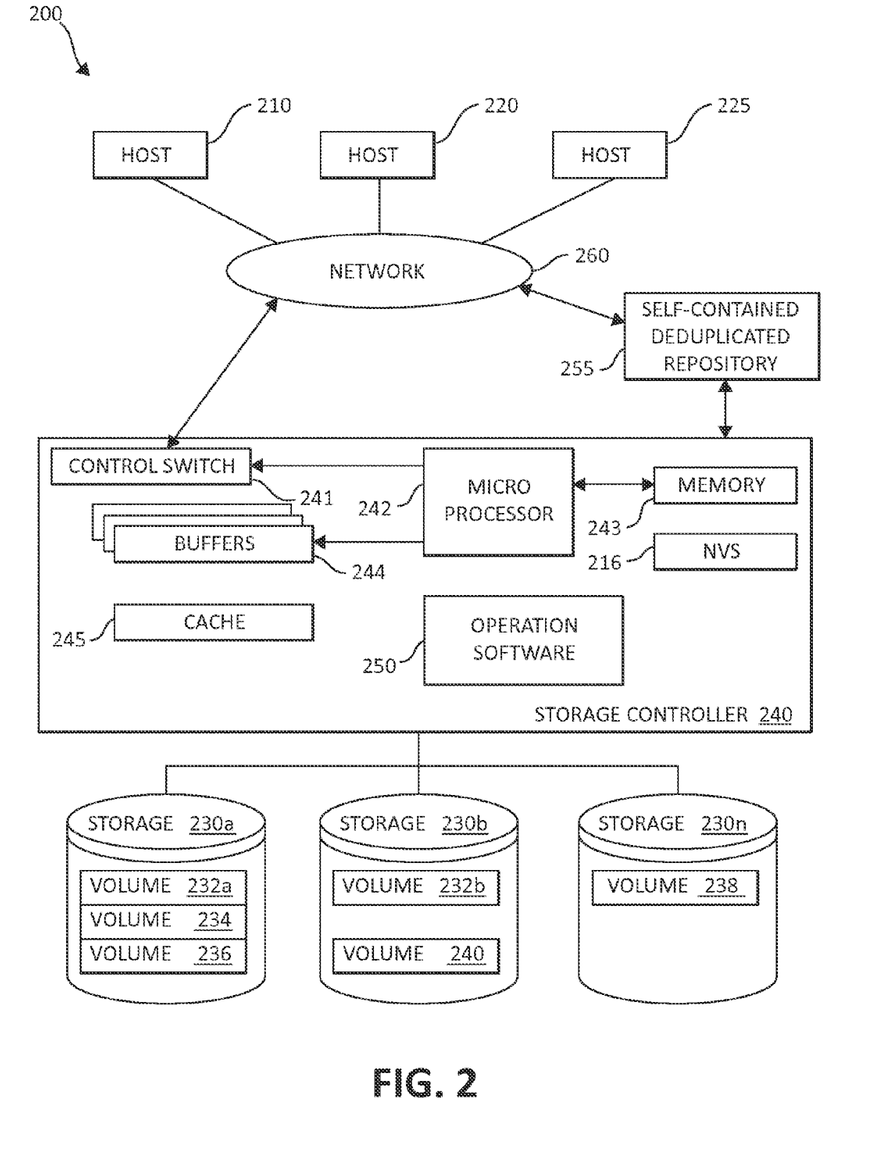
FIG. 2 is a block diagram illustrating a hardware structure of data storage system in a computer system in which aspects of the present invention may be realized.

FIG. 2 is an exemplary block diagram 200 showing an alternative hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a self-contained deduplicated repository 255. The self-contained deduplicated repository 255 may work in conjunction with each and every component of the storage controller 240, the hosts 210, 220, 225, and storage devices 230. The self-contained deduplicated repository 255 may be structurally one complete module or may be associated and/or included with other individual modules. The self-contained deduplicated repository 255 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the self-contained deduplicated repository 255, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, self-contained deduplicated repository 255 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As will be described below, the self-contained deduplicated repository may be created for packing the deduplicated data files in a self-contained deduplicated repository with the self-contained deduplicated repository being stored in a cluster network storage environment (e.g., cloud computing) and/or on a removable media device. To create the self-contained deduplicated repository, a list of files is input into a self-contained deduplicated repository. This list may be the result of another process, a list of files indicated by a user directly or indirectly, and/or files that have yet to be replicated or stored in other removable media or copied to the cluster network storage environment. A table of contents (TOCs) of each of the files in the list is examined one after the other, and a master list of GUIDs is maintained. Each data block, required by any file in the list of files, is added to the master list of GUIDs only once. When the processing of each file in the list of files is complete, the TOCs and the file metadata of each file may be committed to the self-contained deduplicated repository, followed by the master list of GUIDs, and then subsequently the data blocks required to be contained in the self-contained deduplicated repository are committed.

In one embodiment, the master list of GUIDs assists in the searching for a particular block easier at read/restore times, but may be eliminated, according to user preference, and not used in the self-contained deduplicated repository. Data blocks may either be ordered by the GUIDs referencing the data block, and/or the master list of GUIDs (if present) may map the position of the data blocks in the self-contained, deduplicated repository. The data blocks may be fixed or variable size, and may be compressed and/or encrypted. The entire self-contained, deduplicated repository may be compressed and/or encrypted to ensure its security and its integrity.

In one embodiment, the present described herein, may be extended to appending more files to the self-contained deduplicated repository by allowing the file section, the master list of the GUIDs section, and the data block section to repeat. For example, data blocks that already appear in the self-contained deduplicated repository do not need to repeat in a later master lists nor do they need to be placed in later data block sections. In this embodiment, a self-contained deduplicated repository is later being extended one or more times. When a data block is already contained in the repository, the data block's GUID already appears in the original master list, or in a master list that was previously appended to the repository. Similarly, the data of the block already appears in some data block section. Hence, in this case, there is no need to list the GUID of the data block again in the last master list this that is about to be appended, nor is in necessary to include the data of the block in the data block section that is about to be appended.

Figure 3:
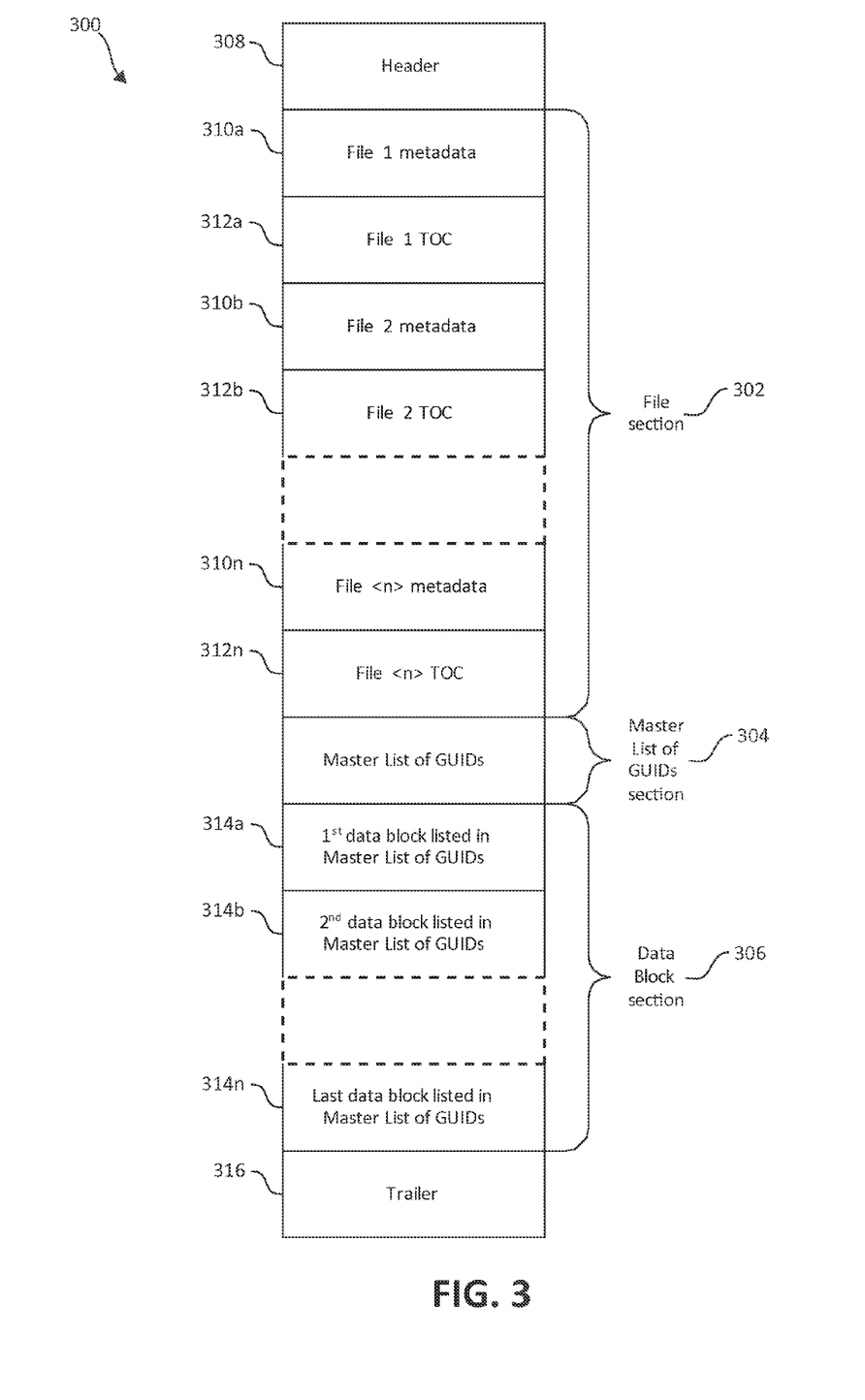
FIG. 3 is a block diagram illustrating a structure of a self-contained deduplicated repository in which aspects of the present invention may be realized.

FIG. 3 is a block diagram illustrating a structure of a self-contained deduplicated repository in which aspects of the present invention may be realized. As illustrated, in one embodiment, the self-contained deduplicated repository 300 contains at the file section 302, the master list of the GUIDs section 304, and the data block section 306. Within the file section 302 a header 308, file metadata 310 (illustrated in FIG. 3 as 310A-N), and the file TOC 312 are contained therein. The master GUID list 304 contains the location of each one of the unique data blocks required by any one of the deduplicated data files 314 in the list of deduplicated data files of the self-contained deduplicated repository 300. The file TOC 312 of each of the deduplicated data files in the file section 302 (e.g., a list of deduplicated data files one after another) is an ordered list of the GUID that make up a file. The data block section 306 lists each data block 314 in an ordered fashion according to the ordered listing of each of the GUIDs in the master GUID list 304. For example, the first data block listed in the master list of the GUIDs is listed first in the data block section. A trailer 316 may be appended to the ending of the data block section 306. Thus, the self-contained deduplicated repository 300 may be and isolated and contain at least the TOC 312 of the deduplicated data files, metadata 310 of the deduplicated data files, and one unique copy of each of the unique data blocks 314.

Figure 4:
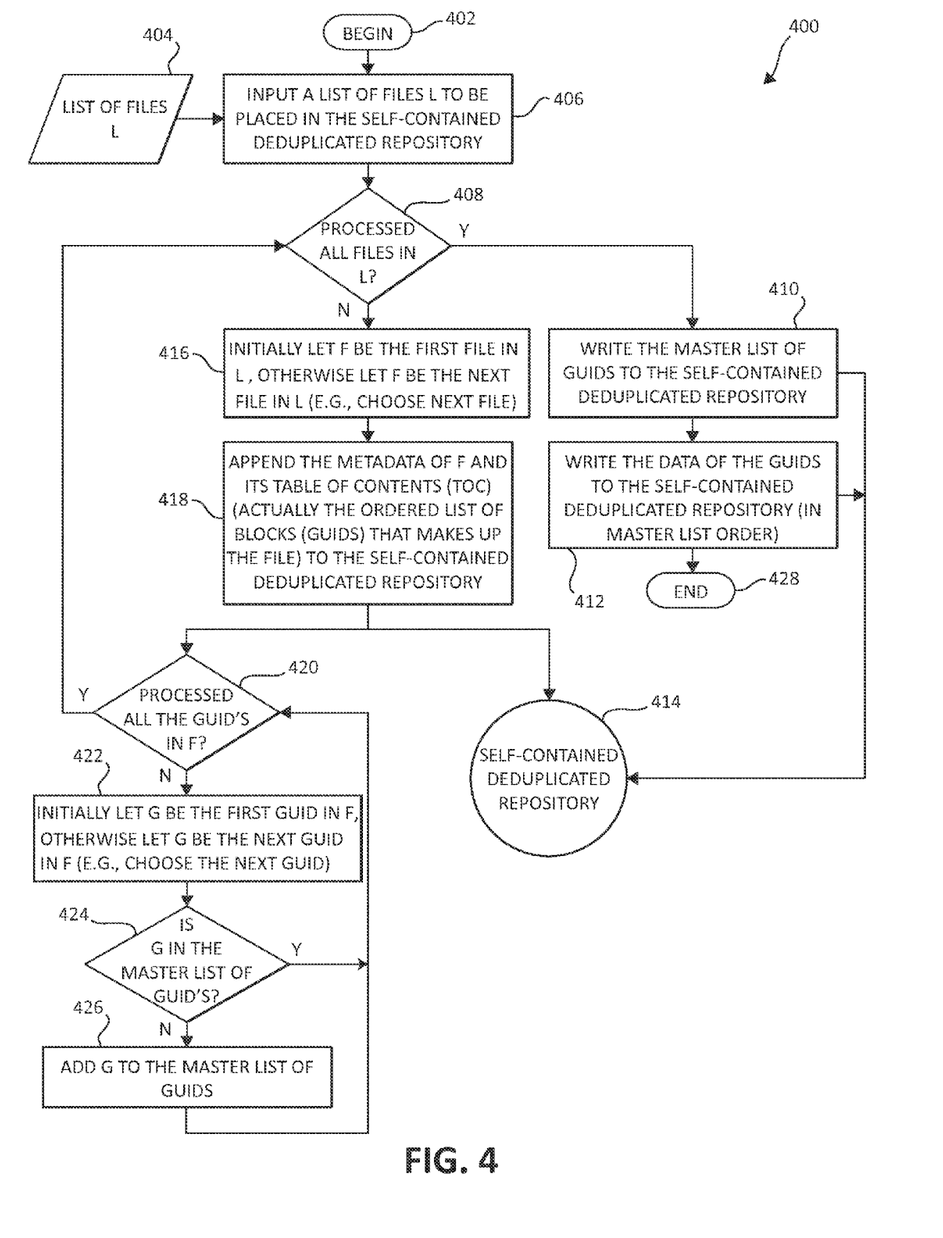
FIG. 4 is a flowchart illustrating an exemplary method for creating a self-contained deduplicated repository from a list of files in which aspects of the present invention may be realized.

Turning now to FIG. 4, a flowchart illustrating an exemplary method 400 for creating a self-contained deduplicated repository from a list of files (e.g., deduplicated files) in which aspects of the present invention may be realized, is depicted. The method 400 begins (step 402) by receiving a list of file (step 404) and inputs the list of files to be placed in the self-contained deduplicated repository (e.g., files inputted into some internal storage structure such as a storage in a cloud or removable media used by the present invention that creates the self-contained deduplicated repository) (step 406). The method 400 determines if all of the files in the list have been processed (step 408). If all of the files in the list have been processed, the method 400 writes a master list of GUIDs to the self-contained deduplicated repository (step 410) and then writes the data of the GUIDs to the self-contained deduplicated repository according to order within the master GUID list (step 412) and thereby creates the self-contained deduplicated repository (step 414). The method 400 ends, following step 412, (step 428). Returning to step 408, if all of the files in the list have not been processed, the method 400 will choose the next file from the list of files that has not yet been processed (step 416). The method 400 appends the metadata and the associated TOC of the file to the self-contained deduplicated repository (step 418). The TOC is an ordered list of blocks (e.g., the GUID of the blocks) that make up the file. The method 400 then determines if all of the GUIDs in the file have been processed (step 420). If yes, the method 400 returns to step 408. If at least one of the GUIDs in the file has not been processed, the method 400 will choose the next GUID from the list of files that has not yet been processed (e.g., sets one of the GUIDs in the file that has not been processed as the first GUID, otherwise the next GUID in the files is the first GUID in the file and will be processed one by one until all the GUID's are processed) (step 422). The method 400 then determines if the GUID is contained in the master list of GUIDs (step 424). If yes, the 400 returns to step 420. If the GUID is not in the master list of GUIDs, the GUID is added to the master list of GUIDs (step 426) and returns back to step 420).

Having demonstrated above in FIG. 4, the creation of the self-contained deduplicated repository, FIG. 5, below, illustrates the process of retrieving a file from the self-contained deduplicated repository. Any file in the self-contained deduplicated repository may be restored by reading the files' TOC and reading the required data blocks off the media (e.g., the self-contained deduplicated repository) using the GUIDs listed in the TOC. In one embodiment, the restoration process may be performed in one single pass of the self-contained deduplicated repository. If the master list of GUIDs is present, the master list of GUIDs may map the GUIDs to the position of the data block in the self-contained, deduplicated repository.

In one embodiment, all the files in the self-contained deduplicated repository or a subset of the files may be merged and stored into an existing repository by reading the files or subset files' TOCs and the files deduplication metadata. All GUIDs needed by these TOCs that do not already exist in the target repository are read from the self-contained deduplicated repository and stored in the target repository. This process may be performed in one single pass of the self-contained deduplicated repository.

Figure 5:
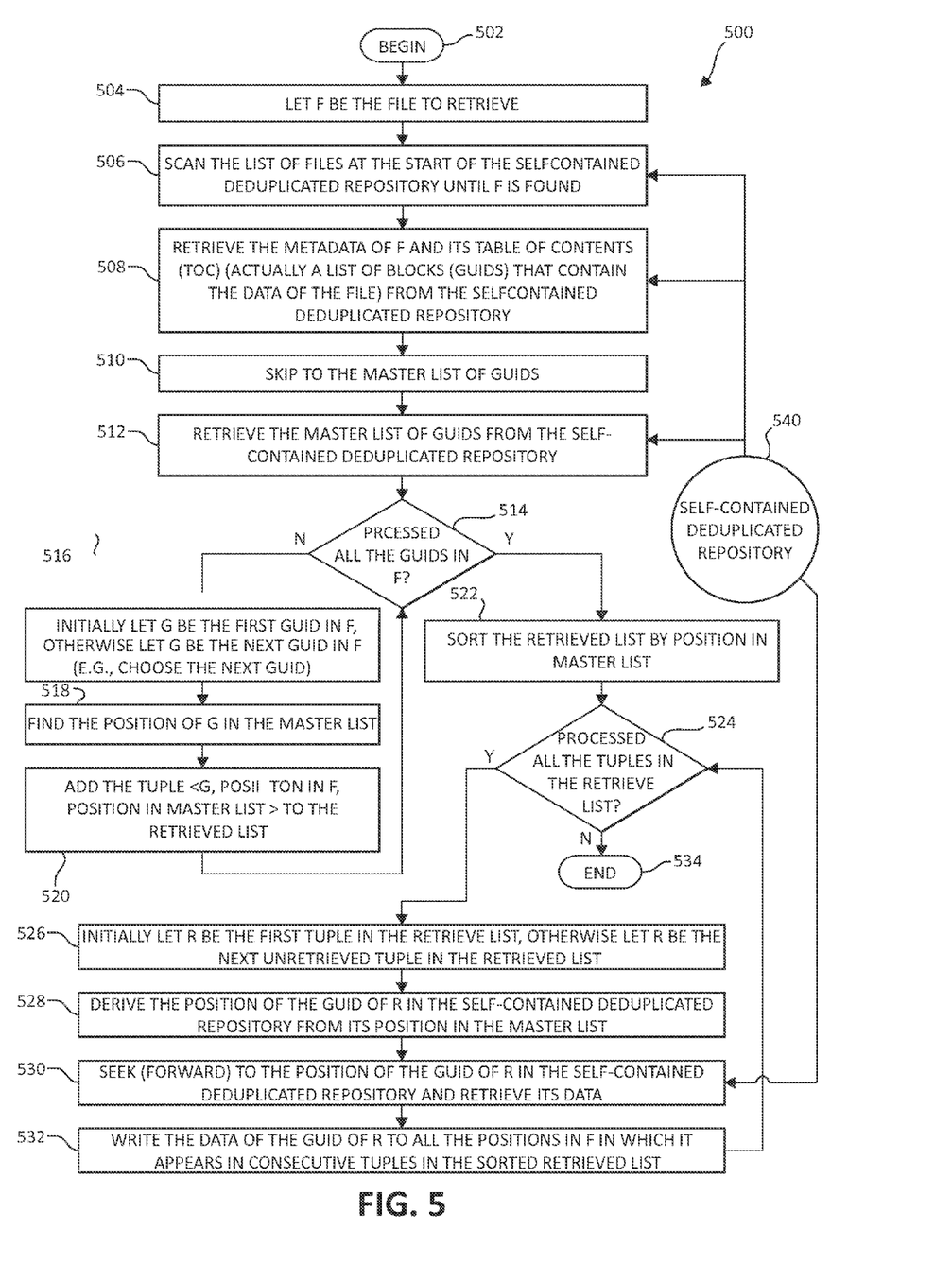
FIG. 5 is a flowchart illustrating an exemplary method for retrieving a file from a self-contained deduplicated repository in which aspects of the present invention may be realized.

Turning now to FIG. 5, a flowchart illustrating an exemplary method 500 for retrieving a file from a self-contained deduplicated repository in which aspects of the present invention may be realized, is depicted. The method 500 begins (step 502) by indicating one of the files that is to be retrieved (step 504). The list of files is scanned at the start of the self-contained deduplicated repository until the identified file to be retrieved is located (step 506). The metadata and the TOC of the identified file are retrieved from the self-contained deduplicated repository (step 508). The TOC is an ordered list of blocks (and the GUID of the blocks) that contain the data of the file from the self-contained deduplicated repository. The method 500 skips to the master list of the GUIDs (step 510) and retrieves the master list of the GUIDs from the self-contained deduplicated repository (step 512). The method 500 determines if all of the GUIDs in the file have been processed (step 514). If at least one of the GUIDs in the file has not been processed, the method 500 will choose the next GUID from the list of files that has not yet been processed (e.g., sets one of the GUIDs in the file that has not been processed as the first GUID, otherwise the next GUID in the files is the first GUID in the file and will be processed one by one until all the GUID's are processed) (step 516). The method 500 then finds the position of the GUID in the master GUID list (step 518). The method 500 adds a tuple, having the GUID, the position of the file, and the position in the master list, to the retrieved master GUID list (step 520). Following step 520, the method 500 returns to step 514. From step 514, if at least one of the GUIDs in the file has been processed, the method 500 sorts the retrieved master list of the GUIDs by position in the master GUID list (step 522). The method 500 determines if all the tuples in the retrieved master list have been processed (step 524). If yes, the method 500 ends (step 534). If any of the tuples in the retrieved master list have not been processed, the method 500 sets one of the tuples in the retrieved master list as the first tuple, otherwise an alternative tuple is set as the next unretrieved tuple in the retrieved master list (step 526). The method 500 derives the position of the GUID of the tuple in the self-contained deduplicated repository from the position in the master GUID list (step 528). The method 500 seeks (forwards) to the position of the GUID of the tuple in the self-contained deduplicated repository and retrieves the data (step 530). It should be noted that for steps 506, 508, and 530, the self-contained deduplicated repository, labeled as step 540, assists in the scanning, retrieving, and seeking (step 540). The data of the GUID of the tuple is written to all the positions in the file in which the GUID appears in consecutive tuples in the sorted, retrieved master GUID list (step 532). The method 500 returns to step 524.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for storing deduplicated data using a processor device in a computing environment, the method comprising:
    packing deduplicated data in a self-contained deduplicated repository having a plurality of unique data blocks with each being referenced by a globally unique identifier (GUID), and the self-contained deduplicated repository also having information regarding both deduplicated data files and the plurality of unique data blocks of each of the deduplicated data files and a master GUID list containing a location of each of the plurality of unique data blocks;
    loading the self-contained deduplicated repository into a target repository, the target repository being stored in a virtual environment;
    creating the self-contained deduplicated repository from a list of deduplicated data files, wherein the self-contained deduplicated repository is isolated such that the self-contained deduplicated repository is stored at a remote location without requiring power and contains a table of contents (TOC) of the deduplicated data files, metadata of the deduplicated data files, and one unique copy of each of the plurality of unique data blocks; and
    merging all deduplicated data files in the self-contained deduplicated repository into a target repository by reading the TOC and deduplication metadata, wherein the TOC and deduplication metadata are stored, and any of the GUID needed by the TOC that do not exist in the target repository are read from the self-contained deduplicated repository and stored in the target repository.

2. The method of claim 1, further including examining the TOC of each of the deduplicated data files in the list of deduplicated data files one after another, wherein the master GUID list is maintained, and the TOC is an ordered list of the GUID that make up a file.

3. The method of claim 2, further including adding to the master GUID list each one of the plurality of unique data blocks required by any one of the deduplicated data files in the list of deduplicated data files containing a location of each of the plurality of unique data blocks.

4. The method of claim 1, further including committing to the self-contained deduplicated repository the TOC and metadata of each of the deduplicated data files in the list of deduplicated data files, the master GUID list, and the plurality of unique data blocks required by any one of the deduplicated data files in the list of deduplicated data files.

5. The method of claim 1, further including performing one of:
    ordering the plurality of unique data blocks in the self-contained deduplicated repository by the GUID, and
    mapping a position of the plurality of unique data blocks in the self-contained deduplicated repository.

6. The method of claim 1, further including performing each of:
    inputting into the self-contained deduplicated repository the list of deduplicated data files,
    determining if each one of the deduplicated data files in the list of deduplicated data files are processed,
    appending metadata and the TOC of the one of the deduplicated data files to the self-contained deduplicated repository if one of the deduplicated data files is not processed, determining if each of the GUID in the one of the deduplicated data files is processed, determining if the GUID is located in the master GUID list, adding the GUID to the master GUID list, writing the master GUID list to the self-contained deduplicated repository, and writing the data of each of the GUID to the self-contained deduplicated repository.

7. The method of claim 1, further including retrieving the deduplicated data file from the self-contained deduplicated repository.

8. The method of claim 7, further including performing one of:

scanning the list of deduplicated data files at the beginning of the self-contained deduplicated repository until locating one of the deduplicated data files to be retrieved, retrieving metadata of the one of the deduplicated data files and the TOC from the self-contained deduplicated repository, skipping to the master GUID list and retrieving the master GUID list from the self-contained deduplicated repository, if each of the GUID in the one of the deduplicated data files is not processed, performing each of:

finding a position of a first GUID in the one of the deduplicated data files in the master GUID list, and adding a tuple to the master GUID list that is retrieved, and if each of the GUID in the one of the deduplicated data files is processed, performing each of:

sorting the master GUID list that is retrieved by position, determining if all tuples in the master GUID list have been processed, deriving a position of the GUID of a first tuple in the self-contained deduplicated repository from the position in the master GUID list that is retrieved, forwarding to the position of the GUID of the first tuple in the self-contained deduplicated repository and retrieving data of the GUID, and writing the data of the GUID of the first tuple to each position in the one of the deduplicated data according to appearance in consecutive tuples in the master GUID list that is sorted.

9. The method of claim 1, further including restoring the deduplicated data file from the self-contained deduplicated repository by reading a table of contents (TOC) of the deduplicated data file and reading each one of the plurality of unique data blocks required by the deduplicated data file using the GUID listed in the TOC.

10. The method of claim 1, further including allowing each deduplication system that draws the GUID for the deduplication system from a similar GUID allocation sphere to share each one of a plurality of self-contained deduplicated repositories, extract files from each one of the plurality of self-contained deduplicated repositories, and append to each one of the plurality of self-contained deduplicated repositories.

* * * * *